United States Patent [19]
Tuttle

[11] Patent Number: 6,097,301
[45] Date of Patent: Aug. 1, 2000

[54] RF IDENTIFICATION SYSTEM WITH RESTRICTED RANGE

[75] Inventor: John R. Tuttle, Boise, Id.

[73] Assignee: Micron Communications, Inc., Boise, Id.

[21] Appl. No.: 08/628,125

[22] Filed: Apr. 4, 1996

[51] Int. Cl.⁷ ..................................................... H04Q 1/00
[52] U.S. Cl. ................... 340/693.9; 340/572.7; 340/10.1; 342/42
[58] Field of Search ............................. 340/825.54, 572, 340/505, 432, 572.7, 572.8, 693.9, 10.1; 342/51, 42

[56] References Cited

U.S. PATENT DOCUMENTS

| | | | |
|---|---|---|---|
| 4,354,189 | 10/1982 | Lemelson | 340/825.31 |
| 4,684,933 | 8/1987 | Dill | 340/572 |
| 5,214,410 | 5/1993 | Verster | 340/572 |
| 5,340,968 | 8/1994 | Watanabe et al. | 235/380 |
| 5,500,651 | 3/1996 | Schuermann | 342/42 |
| 5,534,847 | 7/1996 | McGregor | 340/432 |
| 5,627,517 | 5/1997 | Theimer et al. | 340/572 |

*Primary Examiner*—Brian Zimmerman
*Attorney, Agent, or Firm*—Robert J. Stern

[57] ABSTRACT

A method of adjusting the 2-way communication range of an RFID system to assist a human operator to individually handle and interrogate a plurality of tagged objects, such as suitcases, that each include an RFID tag transceiver. An RFID interrogator transceiver is mounted on the human operator. The 2-way communication range between the interrogator transceiver and the tag transceivers is adjusted to only slightly exceed the closest distance between the interrogator and the tag while the operator is handling the tagged object. Preferably, the 2-way communication range is short enough that other tagged objects will remain outside the communication range and will not respond to messages from the interrogator. Another aspect of the invention is a method of verifying whether an object to be transported has reached its intended destination. In this aspect, an interrogator transceiver at a first destination interrogates an RFID tag transceiver on the object, and in response the tag transmits its intended destination.

5 Claims, 3 Drawing Sheets

RF IDENTIFICATION SYSTEM WITH RESTRICTED RANGE

FIELD OF THE INVENTION

The invention relates generally to RF identification tags and interrogators, that is, to systems for identifying objects by communication between a radio frequency transceiver mounted on each object (RF identification "tag") and a radio frequency transceiver "interrogator". More specifically, the invention relates to such a system in which one or more human operators each has his own interrogator, and in which the 2-way communication range between each operator's interrogator transceiver and the tags is adjusted so as to prevent communications between the interrogator and more distant tags.

BACKGROUND OF THE INVENTION

Radio frequency identification (RFID) systems have been proposed for identifying tagged objects for such purposes as taking inventory or tracking movements of objects being transported. Examples are described in commonly assigned U.S. Pat. Nos. 5,300,875; 5,365,551; and 5,448,110.

RFID systems generally employ a passive or active RF transceiver, called a "tag", mounted on each object to be identified or tracked. An interrogator transceiver periodically transmits RF interrogation signals. Upon receiving an interrogation signal, a tag responds by transmitting a response signal containing data which identifies the object and contains any other information which may have been stored or programmed in the tag.

Conventional RFID systems provide little or no interactive feedback in response to actions performed by handling personnel. Specifically, conventional RFID systems lack any means for discriminating in favor of an individual tagged object a human operator is working with at any given moment; instead, conventional RFID systems generally would confuse the operator by providing information regarding all the tagged objects in the vicinity. Furthermore, if a number of personnel are working close to each other, conventional RFID systems cannot direct information about a tag to the specific individual who is handling the tagged object.

For example, suppose a number of airport baggage handler personnel are sorting or routing tagged suitcases according to the airline flight destination encoded in a tag attached to each suitcase. Conventional RFID systems lack any means for detecting which individual suitcase a human operator or baggage handler is about to pick up so as to provide to the operator only the destination or routing information for the suitcase that person currently is handling, to the exclusion of information about other nearby suitcases. Presumably because of this and other shortcomings of conventional RFID systems, RFID tags never entered commercial use for tagging airline baggage.

SUMMARY OF THE INVENTION

The present invention is a method of adjusting the 2-way communication range of an RFID system to assist a human operator to individually handle and interrogate a plurality of tagged objects, such as suitcases, which each include an RFID tag transceiver. An RFID interrogator transceiver, preferably mounted on the operator, periodically broadcasts interrogation messages. Any tag transceiver which is within 2-way communication range of the interrogator receives the broadcasted message and responds by transmitting an identifying message containing data identifying the tagged object. The interrogator transceiver receives the response message from the tag and presents to the operator the identifying data contained in the response message, typically via an aural transducer or visual display.

In a first embodiment of the present invention, the 2-way communication range between the interrogator transceiver and the tag transceivers is adjusted to only slightly exceed the closest distance between the interrogator and the tag while the operator is handling the tagged object. Consequently, other tagged objects will remain outside the communication range and will not respond to interrogation messages. Therefore, the operator can be confident that the identifying information he receives from the interrogator pertains to the individual tagged object which the operator currently is handling, rather than pertaining to other tagged objects nearby.

The interrogator transceiver can be mounted anywhere on the operator's person so as to leave both of the operator's hands free for handling the tagged objects. For example, the interrogator can be mounted on the person's belt. Furthermore, the interrogator can have an antenna mounted separately, preferably on the operator's wrist band or similarly near the person's hand, so that the operator can extend his hand toward a tagged object to bring the antenna within close communication range of the RFID tag on the object. This allows reducing the communication range so as to minimize the possibility of responses from RFID tags other than the one associated with the individual tagged object which the operator currently is handling.

A second embodiment of the invention does not necessarily limit the interrogator to communicating with a single tag as in the first embodiment. Instead, an objective of the second embodiment is to prevent one operator's interrogator from communicating with tagged objects being handled by other operators working nearby in the same facility. In this embodiment, the 2-way communication range between one operator's interrogator and the tags is adjusted so that all tagged objects being handled by other operator personnel are outside the range. Unlike the first embodiment, the 2-way communication range between the interrogator and the tags need not be so short that only one tagged object at a time can be within the range.

DETAILED DESCRIPTION OF THE PREFERRED EMBODIMENTS

1. Overview

Figure 1:
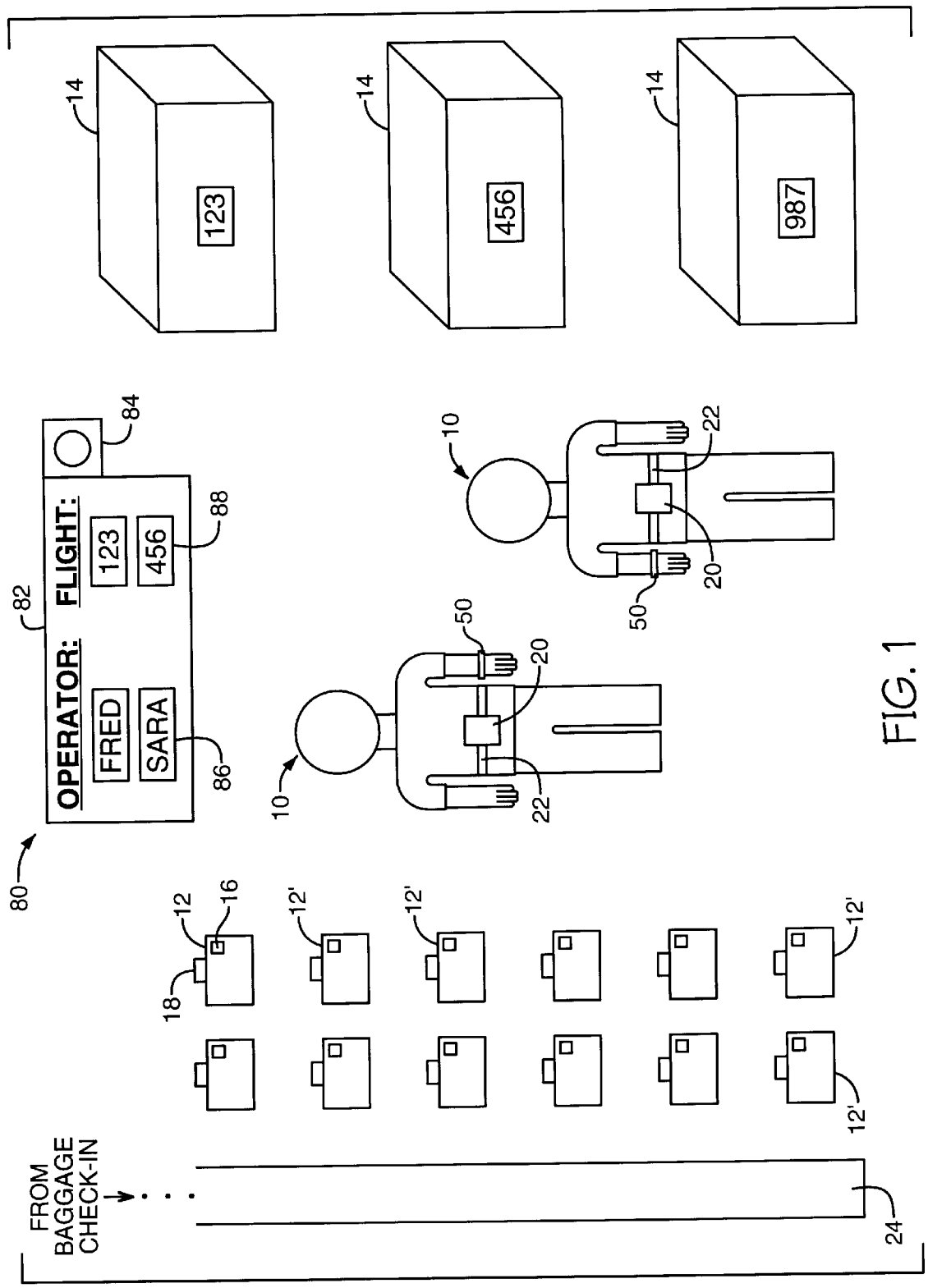
FIG. 1 is a schematic depiction of an airport baggage sorting facility employing the present invention.

The invention will be described in the context of an exemplary implementation, depicted in FIG. 1, in which the human operators 10 are baggage handler personnel working in an airport baggage sorting facility, and the tagged objects 12 are airline baggage. However, the invention is equally applicable to any other objects to which RFID tags may be attached.

In the airport example, a number of baggage handler personnel 10, hereinafter called "operators", are responsible for loading a large number of suitcases 12 and other baggage pieces into various freight containers 14, where each freight container has been designated to be loaded on a specific aircraft flight. An operator's job is to read the designated flight number and/or destination from a tag 16 attached to each suitcase and then to load the suitcase in the correct freight container.

Figure 4:
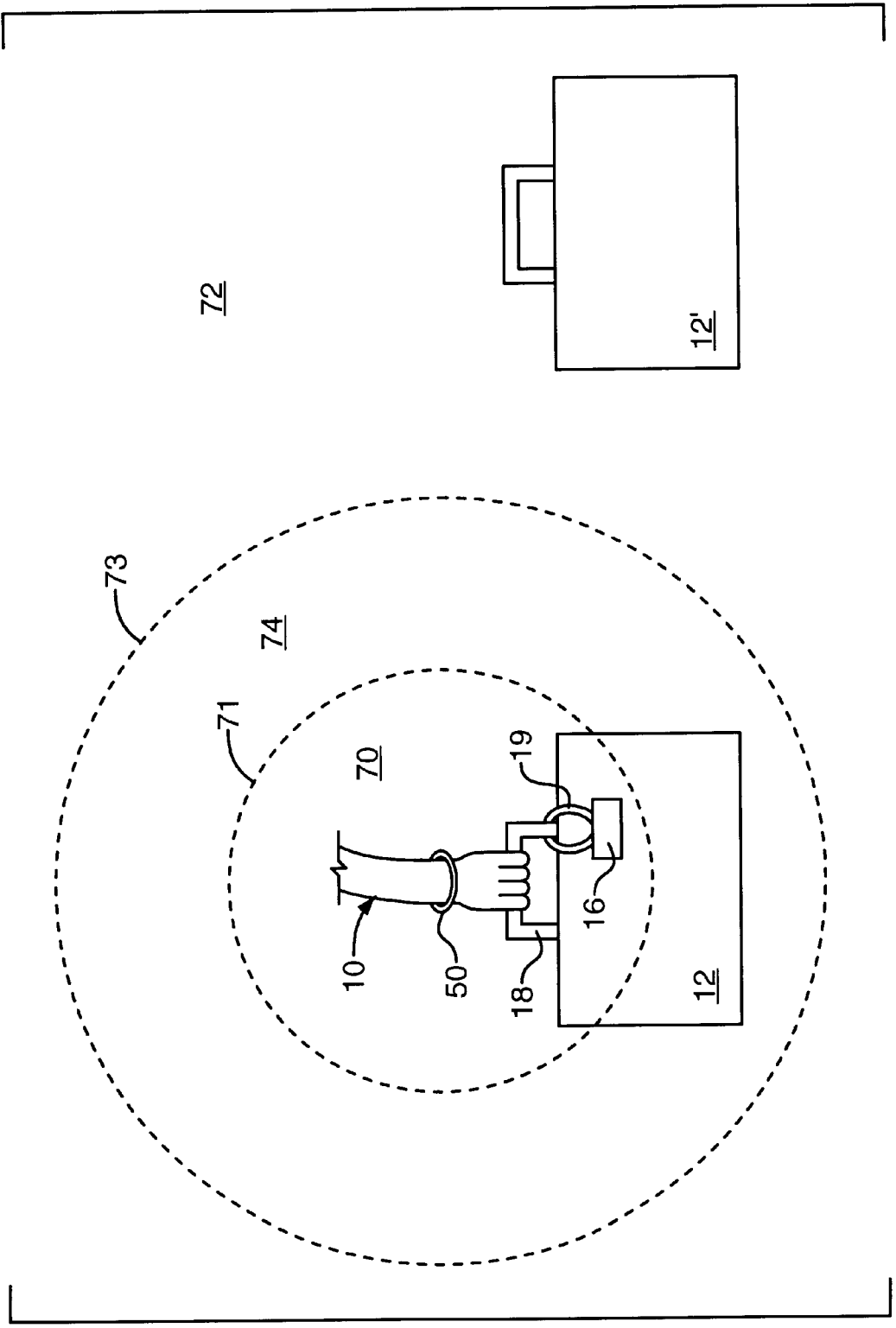
FIG. 4 is a schematic depiction of the reliable, unreliable, and zero two-way communications zones surrounding an interrogator transceiver.

Personnel at the airport passenger check-in counter attach an RFID tag 16 to each suitcase 12. Preferably, the RFID tag is mounted near a handle 18 of the suitcase so that an operator's hand will be as close as possible to the tag when the operator grasps the handle to pick up the suitcase. For example, the tag may be attached to the handle by a strap 19, as shown in FIG. 4.

A semiconductor memory 38 within the tag is programmed to store information on the itinerary of the suitcase, such as flight number, time, and destination. Optionally, the tag's memory may be programmed with additional information such as the name of the owner and special handling instructions.

The tag's memory can be programmed by any conventional means for storing data in a memory device connected to an RF transceiver. For example, the RF communications protocol used by the tag transceiver can include commands for storing data, so that such commands could be transmitted to the tag's transceiver by a transmitter used by airport check-in personnel. Alternatively, the tag may include physical connectors for connecting the tag to a conventional memory programming apparatus used by airport check-in personnel.

After mounting an RFID tag on the suitcase, the check-in counter personnel place the suitcase on a conveyor belt 24 which carries the suitcase to a large baggage sorting facility such as the sorting facility shown in FIG. 1. The sorting facility includes a plurality of freight containers 14, each container being labelled with the flight number of an aircraft whose baggage is to be loaded into that container by the baggage handler personnel (i.e., the operators). After the operators load the appropriate baggage into a container, the container is wheeled from the baggage sorting facility to the aircraft, where other baggage handler personnel transfer the baggage from the container to the aircraft. The process is performed in reverse when the aircraft reaches its destination.

Each baggage handling operator 10 in the sorting facility carries a battery-powered RFID interrogator transceiver 20, the interrogator preferably being attached to the operator's body or clothing so as to leave the operator's hands free and not obstruct the operator's movements. For example, the interrogator may be attached to a belt 22 worn around the operator's waist. (Alternatively, the interrogator may be attached to a strap or belt worn around the operator's leg, arm, or wrist.) As the operator moves within a certain proximity of an individual suitcase 12, the tag 16 on the suitcase receives an interrogation signal transmitted periodically from the operator's interrogator 20. The tag 16 responds by transmitting a message containing the itinerary information stored in the tag's memory. The interrogator 20 receives the message and conveys the itinerary information to the operator, preferably either visually or aurally. The operator uses the itinerary information to decide which freight container 14 the suitcase should be loaded into.

When the aircraft reaches its destination, each of the personnel who unload baggage from the airplane preferably also carries an RFID interrogator 20 attached as described above. Each interrogator carried by the unloading personnel would include memory in which a code representing the city (or airport) in which the interrogator is actually located. The interrogator periodically broadcasts interrogation messages and receives a response from each tagged object picked up by the person carrying the interrogator. The control logic 56 in the interrogator is programmed to compare the intended destination city transmitted by each tag with the interrogator's actual location city stored in memory 58. If the intended and actual destinations do not match, the interrogator presents a warning signal to the unloading person to alert him that the piece of baggage he currently is unloading does not belong in that city.

For baggage unloading, an alternative to each unloading person carrying an interrogator is to mount a single RFID interrogator 20 at each aircraft door through which baggage is unloaded. As described in the preceding paragraph, the interrogator should announce a warning if a piece of baggage exiting the door has an intended destination different from the actual destination stored in the interrogator. The interrogator can be battery-powered for portability, and can be mounted near the aircraft cargo door by any means. Since the interrogator only needs to be mounted during the short time baggage is being unloaded, the mounting means can be temporary. A presently preferred mounting means is a suction cup affixed to the interrogator, allowing it to be temporarily attached to the aircraft skin or door panel.

Mounting an interrogator transceiver adjacent to a cargo door, as described in the preceding paragraph, also is useful when first loading baggage on an aircraft to verify that no baggage is loaded which was intended for a different flight. For purposes of loading rather than unloading, the airplane flight number or similar identification should be stored in the interrogator's memory 58. The control logic 56 in the interrogator should be programmed to compare the intended flight number transmitted by each tag to the flight number stored in the interrogator memory, and then signal human personnel in the event of a discrepancy.

Any of the interrogator transceivers described above can re-transmit data received from tags to a central computer 80. The central computer should include an RF receiver for receiving the data and a memory for storing it. The data stored in the central computer is useful for tracking the progress of baggage in case of an inquiry or a lost object.

The RFID tag transceivers 16 and RFID interrogator transceiver 20 used in the present invention can be any conventional RFID (radio frequency identification) transceivers, examples of which are described in U.S. Pat. No. 4,075,632 to Baldwin et al.; U.S. Pat. No. 4,857,893 to Carroll; U.S. Pat. No. 4,862,160 to Ekchian et al.; U.S. Pat. No. 5,055,659 to Hendrick et al; U.S. Pat. No. 5,144,314 to Malmberg et al.; and U.S. Pat. No. 5,245,346 to Nishimura et al. The entire contents of each of these patents is hereby incorporated into this patent application.

A preferred physical implementation of an RFID tag transceiver 16 is described in U.S. Pat. Nos. 5,406,263; 5,448,110; and 5,497,140. A preferred protocol for communications between the interrogator 20 and the tags 16 is described in U.S. Pat. No. 5,500,650. The entire contents of each of these patents is hereby incorporated into this patent application.

Figure 2:
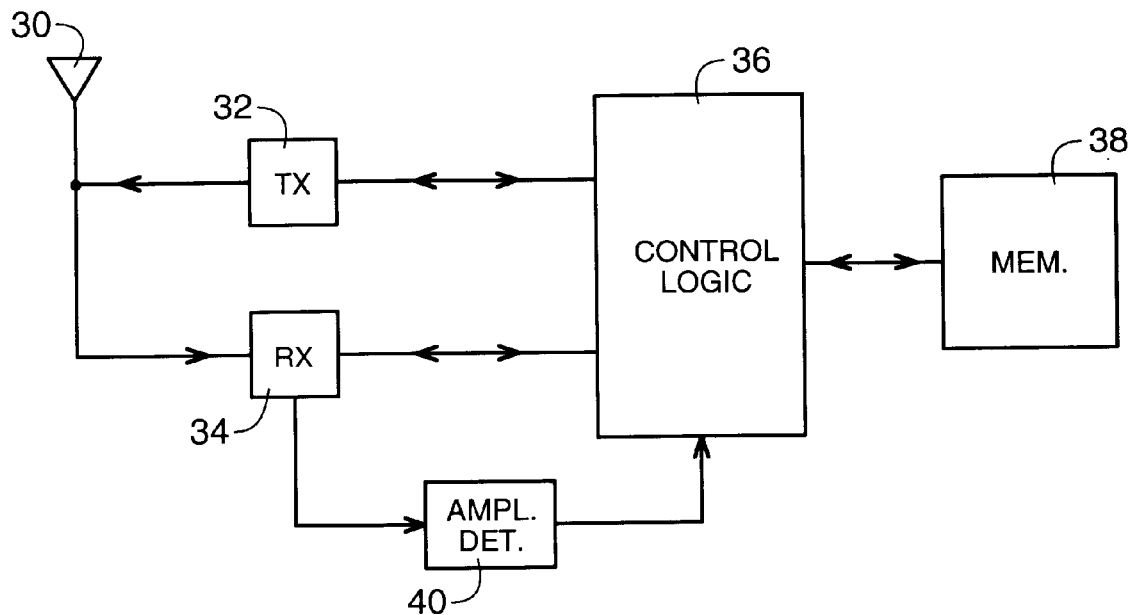
FIG. 2 is a block diagram of an RFID tag transceiver used in the present invention.

FIG. 2 shows an RFID tag transceiver 16 suitable for use with the present invention. An antenna 30 connects to the output of a transmitter 32 and to the input of a receiver 34. A control logic circuit 36, such as a programmable microcomputer, receives data which has been received and demodulated by the receiver 34, provides data to the transmitter 32 with which the transmitter is to modulate the transmitted RF signal, and provides control signals to both the receiver and the transmitter. The control logic circuit 36 also exchanges data with a memory 38. All the components just described are conventionally included in an RFID tag transceiver. As described below, the tag transceiver optionally includes an RF signal amplitude detector 40. Such amplitude detectors are well known, but are not conventionally included in RFID transceivers.

Figure 3:
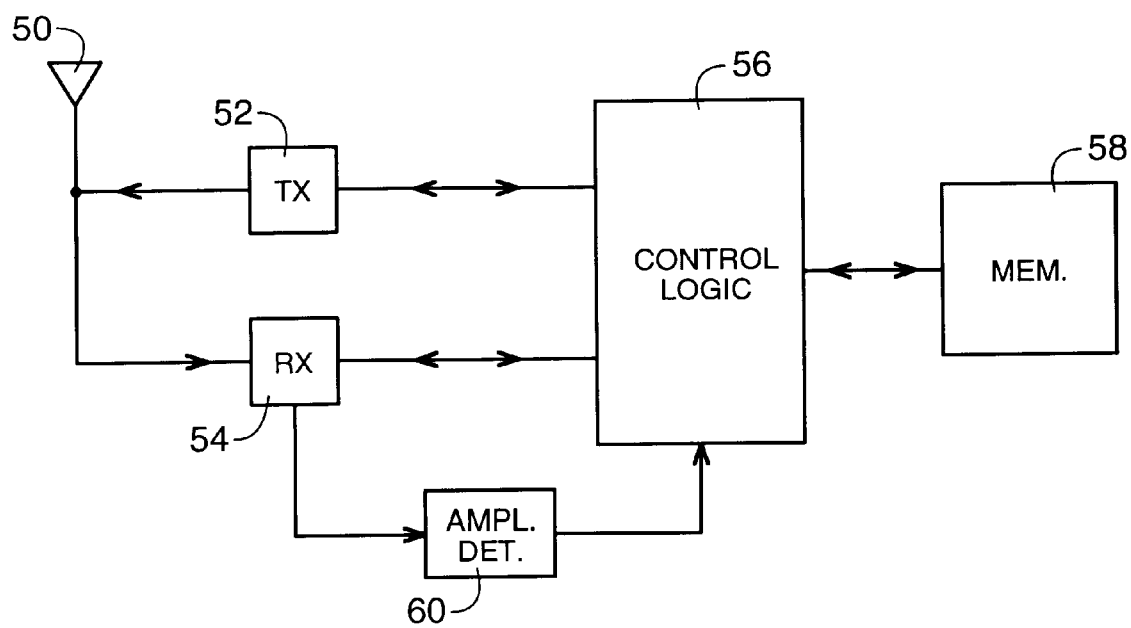
FIG. 3 is a block diagram of an RFID interrogator transceiver used in the present invention.

FIG. 3 shows an RHID interrogator transceiver 20 suitable for use with the present invention. The interrogator has the same components as the tag, namely, an antenna 50, transmitter 52, receiver 54, control logic circuit 56, memory 58, and optional RF signal amplitude detector 60.

2. Excluding Nearby Tags from Communication Range

When the operator 10 receives itinerary information for a suitcase 12, it is important for the operator to know which suitcase the information pertains to. In the present invention, this is accomplished by limiting the transmitter power and/or the receiver sensitivity of the operator's interrogator, of the tags, or of both so that 2-way communication between the interrogator and the tags is possible only over a very short range. Specifically, the maximum range or distance across which the interrogator 20 and tags 16 can reliably communicate should be adjusted so that it is only slightly greater than the distance between the antenna of the operator's interrogator and the tag attached to the single suitcase the operator is handling. All other suitcases 12' in the baggage handling facility should be outside this range.

More specifically (see FIG. 4), depending on the transmitter power, receiver sensitivity, and antenna radiation pattern of the RFID tags 16 and the interrogator 20, there will be a "reliable 2-way communication" inner zone 70 surrounding the antenna 50 of the operator's interrogator within which an RFID tag 16 will be close enough to reliably communicate with the interrogator, and a zero 2-way communication" outer zone 72, defined by a boundary 73 surrounding the inner zone, beyond which boundary 73 an RFID tag cannot successfully communicate with the operator's interrogator. Between the respective boundaries 71 and 73 of the inner and outer zones 70 and 72 is an "unreliable 2-way communication" intermediate zone 74 within which a tag can communicate with the interrogator with uncertain reliability.

The distance between the antenna 50 of the operator's interrogator and the tag 16 on a suitcase will be minimum when the operator 10 grasps the suitcase 12 to move it to the container 14 for the appropriate aircraft. The reliable 2-way communication range 70 between an operator's interrogator and the nearby tags should be adjusted to only slightly exceed this minimum distance. Specifically, the reliable 2-way communication range should be adjusted so that (i) a suitcase being grasped or otherwise handled by the baggage handling operator is within the "reliable 2-way communication inner zone" surrounding the interrogator's antenna, and (ii) all other nearby suitcases 12' are outside this inner zone, and preferably are outside the boundary of the "zero 2-way communication" outer zone. If the 2-way communications range is adjusted according to these criteria, only the tag on the single suitcase currently being handled will be close enough for 2-way communication with the operator's interrogator. Therefore, the operator can be confident that the identifying information he receives from the interrogator pertains to the individual suitcase 12 the operator currently is handling, rather than pertaining to other suitcases 12' nearby.

An interrogator and tag are considered to be within reliable 2-way communication range of each other only if the tag can reliably receive RF signals from the interrogator and the interrogator can reliably receive RF signals from the tag. If RF signals can be reliably received by the interrogator from the tag, but not by the tag from the interrogator—or vice versa—then only one-way reliable communication is possible, and the interrogator and tag are not considered within reliable 2-way communication range. In other words, the reliable 2-way communication range is the lesser of (a) the maximum distance over which the interrogator can reliably receive RF signals from the tag, and (b) the maximum distance over which the tag can reliably receive RF signals from the interrogator.

Consequently, the reliable 2-way communication range can be reduced by reducing the reliable one-way communication range in either direction, that is, by reducing either the tag-to-interrogator one-way range "a" or the interrogator-to-tag one-way range "b" defined in the preceding paragraph.

The one-way communication range from the tags to the operator's interrogator (range "a" defined above) can be reduced either by reducing the transmitter power of all the tags which otherwise could be within communication range of the interrogator or by reducing the receiver sensitivity of the interrogator. Conversely, the one-way communication range from the operator's interrogator to the tags (range "b" defined above) can be reduced either by reducing the transmitter power of the interrogator or by reducing the receiver sensitivity of all the tags which otherwise could be within communication range of the interrogator.

There are various conventional circuit designs for adjusting transmitter output power or receiver sensitivity. For example, to permit adjusting the sensitivity of the receiver section of each tag and/or the interrogator, the receiver section can include a conventional circuit 40, 60 for detecting the amplitude of the received signal (i.e., the signal strength), and a comparator which rejects any received signal whose strength is below a certain threshold. The threshold can be adjusted to adjust the communications range. Preferably, the comparator and threshold are implemented by suitable programming of the control logic circuit 36, 56.

The adjustments to the transmitter power and/or receiver sensitivity of the tags and interrogators can be made at the time of their manufacture. The adjustments to an interrogator also can be performed when the interrogator is placed in service in a given facility, thereby permitting customization of the communication range based on the actual distances between the interrogator and the tagged objects in that facility. Alternatively, the interrogator can include circuitry for automatically adjusting its transmitter output power and/or receiver sensitivity to achieve 2-way communication with only the single tagged object being handled at a given time.

A particularly preferred embodiment of the interrogator transceiver automatically adjusts the 2-way communication range by reducing its transmitter RF output power, thereby attaining the additional advantage of reducing its battery consumption. In this embodiment, the interrogator transceiver initially broadcasts an interrogation signal at a very low transmitter RF output power level. If no tag responds, the interrogator broadcasts the interrogation signal again at a higher power level. If again no tag responds, the interrogator broadcasts the interrogation signal at progressively higher power levels until either a tag responds or the interrogator reaches its maximum transmitter output power. In the latter case, the interrogator waits a certain period of time (for example, 0.2 second), then repeats the process starting with the lowest power level.

When a tag does respond to an interrogation signal which the interrogator transmitted at a given power level, the interrogator maintains that power level for all subsequent transmissions to that tag. Thus, the interrogator employs the lowest transmitter power needed to communicate with the tag, thereby minimizing power drain from the interrogator's battery. Furthermore, when the interrogator or its antenna is close to a tag (as when the operator is grasping or handling a tagged object), this embodiment of the interrogator inherently adjusts its transmitter output power to a level just high enough to reliably communicate with the closest tag, but not high enough to communicate with other, more distant tags. Therefore, this embodiment of the interrogator performs automatically the adjustment of 2-way communication range described earlier. The adjustment steps preferably are implemented by programming the control logic circuit 56.

In a preferred embodiment of the RFID tags, which advantageously limits the 2-way communication range between the tags and the interrogator, each tag is a passive RF transceiver, also called a modulated backscatter RF transceiver. Such a transceiver responds to an interrogator signal by modulating the RF carrier of the interrogator signal with the itinerary information and reflecting or re-radiating the modulated signal back toward the interrogator. Examples of modulated backscatter transceivers are described in U.S. Pat. No. 3,832,530 issued Aug. 27, 1974 to Reitboeck et al.; U.S. Pat. No. 4,075,632 issued Feb. 21, 1978 to Baldwin et al.; U.S. Pat. No. 4,857,893 issued Aug. 15, 1989 to Carroll; and U.S. Pat. No. 5,313,211 issued May 17, 1994 to Tokuda et al.; the entire contents of each of which are hereby incorporated into this patent specification. The amplitude of the RF signal received by the interrogator from a modulated backscatter tag will decline approximately in proportion to the fourth power of the distance between the respective antennas of the tag and the interrogator, assuming both antennas are fairly omnidirectional. In contrast, if the tags had active transmitters with fixed output power, the amplitude would decline only in proportion to the square of the distance.

Using the just described RFID tags with modulated backscatter RF transceivers in combination with the previously described preferred interrogator with automatically adjusting transmitter power, I have found that the interrogator reliably communicates with a tagged suitcase 12 when it is grasped by a human operator, while reliably ignoring the tags on other suitcases 12' nearby.

3. Antenna Location

The mounting location of the antenna 50 of the interrogator also affects the ability of the interrogator to discriminate against suitcases other than the one currently being handled by the operator. The most convenient and unobtrusive location of the antenna typically is in the same housing as the interrogator transceiver 20, which, as described above, may be attached to the operator's clothing such as a belt 22 worn around the operator's waist. With the interrogator and its antenna mounted on the operator's torso, the required 2-way communication range between the interrogator and the tag depends on how close the operator's torso approaches the suitcase during normal handling.

To prevent tags on adjacent suitcases from responding to the interrogator, the distance from the operator's torso to the suitcase being handled should be much smaller than the distance from the operator's torso to any nearby suitcases. If the suitcases are too close together to satisfy this condition, then it is preferable to mount the antenna of the interrogator transceiver on the operator's hand, wrist, or forearm so that the operator can extend his arm toward the tag mounted on the individual suitcase the operator currently is handling, thereby reducing the distance between interrogator antenna and the tag.

For example, the antenna 50 of the interrogator transceiver can be mounted in a wrist strap worn on the operator's wrist (see FIG. 4). If the tag is attached to the handle of a suitcase, then the interrogator antenna will be closest to the tag (a distance of only two or three inches) when the operator grasps the suitcase handle. The 2-way communication range between the interrogator and tags should be adjusted, as described above, so that the "reliable 2-way communications inner zone" is only slightly greater than this closest distance (i.e., a few inches). Preferably, a consequence of this adjustment is that the "zero 2-way communication outer zone" boundary is on the order of one foot from the interrogator antenna, whereby the suitcase being handled will be within the inner zone and all other suitcases will be outside the boundary of the outer zone.

The antenna and interrogator can be fabricated as an integral unit which is mounted on the operator's hand, wrist, or forearm, if the interrogator is small enough to be worn comfortably in this manner.

4. Interrogator Presentation of Information to Operator

As described above, when a human operator approaches close enough to a tagged suitcase for the operator's interrogator and the tag to be within 2-way communication range, the tag will receive an interrogation signal from the interrogator and will respond with a message identifying itself to the interrogator. The interrogator then should present to the operator relevant portions of the identifying information, such as airline flight number or destination. The information can be presented aurally or visually.

Specifically, the identifying information can be presented aurally through a loudspeaker mounted in the same enclosure as the interrogator. More preferably, to prevent operators in the same vicinity from disturbing each other, the information can be presented through headphones or similar sound transducers worn or in or adjacent to the operator's ears. Alternatively, the information can be presented visually by a small video display panel mounted on the same enclosure as the interrogator or, more preferably, by a conventional heads-up display incorporated in eye goggles or eyeglasses worn by the operator.

In the previously described example of an aircraft baggage sorting facility for loading baggage onto departing aircraft, the information the interrogator presents to the baggage handling operator when he picks up a suitcase typically would be the flight number of the aircraft on which the suitcase belongs and the destination city of the suitcase. Using this information, the operator then loads the suitcase into the container or truck designated for that flight number.

The invention also is useful for baggage handling operators who unload suitcases from an arriving aircraft. Because a given flight typically stops in several destination cities, the baggage unloading operators in a given destination city must ensure they only unload baggage whose intended destination is that city. For this application, the name or identification code for the current city should be stored in a semiconductor memory in each operator's interrogator. The interrogator should be programmed to compare the stored city code with the destination city information transmitted by each tagged object handled by the operator. In case the intended destination transmitted by a tag differs from the actual destination stored in the interrogator's memory, the interrogator should present an audible or visual error warning to the operator. For example, the interrogator might contain a green light which flashes when the operator picks up a suitcase whose tag designates the same destination stored in the interrogator, and a red light which flashes when the tag designates a different destination.

As an alternative to each operator's carrying or wearing an audio transducer or video display as just described, several operators working in the same area or facility can share a central control center 80 located in their work area. The interrogator of each operator can transmit RF signals to the central control center using the same transceiver which the interrogator uses to communicate with the tags. Specifically, each interrogator should transmit to the control center RF message signals containing the identifying information received from tags plus the interrogator's own identification number. The control center can display the information received from all the operators' interrogators on a single video display 82, or the control center can present the information in audible form over a loudspeaker 84 which all the operators in the vicinity can hear.

If multiple operator personnel share a central audio transducer or visual display, the presentation of information from each tag should be accompanied by the name or other identification of the operator who is handling the tagged suitcase, that is, the operator whose interrogator received the information from the tag. For example, in a video display, each operator's name 86 should be displayed next to the identifying information 88 from the tag of the suitcase he currently is handling. With an audio transducer, each operator's name should be pronounced immediately before presenting the identifying information for the suitcase that operator currently is handling.

Whether or not a shared control center presents information to the operators as just described, the control center 80 can include a computer which functions as a central database which stores a record of which suitcases have been handled and by which operators. The central database can be used to track the progress of the suitcases from one location to another. In case a suitcase is misdirected, the database can help identify which operator was responsible for the error.

5. Embodiment for Discriminating Among Operator Personnel

An alternative embodiment of the invention does not necessarily limit the interrogator to communicating with a single tag as in the preceding embodiments. Instead, the objective of this alternative embodiment is to prevent one operator's interrogator from communicating with tagged objects being handled by other operators working nearby in the same facility. In this embodiment, the 2-way communication range between one operator's interrogator and the tags is adjusted so that all tagged objects being handled by other operator personnel are outside the range. As in the preceding embodiments, the adjustment may be performed by adjusting the transmitter output power and/or the receiver sensitivity in the interrogator transceiver, in the RFID tags, or in both. Unlike the preceding embodiments, the 2-way communication range between the interrogator and the tags need not be so short that only one tagged object at a time can be within the range.

6. Conclusion

The invention has been described in the context of an aircraft baggage handling facility. Nevertheless, the invention is equally useful in other transportation facilities for sorting or handling cargo or goods to be transported in vehicles other than airplanes. More generally, the invention is equally useful in any facility in which human operators handle or monitor any type of objects to which conventional RFID tags can be affixed.

What is claimed is:

1. A method of adjusting the two-way communication range of an RFID system to permit a person to individually handle and interrogate each one of a plurality of tagged objects, each tagged object having an RFID tag transceiver, comprising the steps of:

mounting on the person an RFID interrogator transceiver having an antenna:

mounting the antenna of the interrogator transceiver near one hand of the person, so that the person can reduce the distance between the antenna and a tag transceiver to a minimum distance by extending his hand toward the tag transceiver;

mounting on each tagged object an RFID tag transceiver, wherein each tag transceiver is characterized by a set of one or more performance parameters which control a reliable two-way communications range between that tag transceiver and the interrogator transceiver, and the interrogator transceiver is characterized by a set of one or more performance parameters which control the reliable two-way communications range between the interrogator transceiver and any of the tag transceivers; and adjusting at least one of the performance parameters so that the reliable two-way communications range between the interrogator transceiver and the transceiver of each of the tagged objects slightly exceeds said minimum distance.

2. A method according to claim 1, further comprising the step of:

the person grasping with said one hand a handle of at least one of the tagged objects, wherein the step of mounting an RFID: tag transceiver on each tagged object includes mounting each tag transceiver near a handle on its respective tagged object.

3. An RFID interrogator apparatus having an adjustable two-way communication range so as to permit a person to individually interrogate the closest one of a plurality of nearby tagged objects, wherein each tagged object has a respective RFID tag transceiver attached thereto, comprising:

an RFHD interrogator transceiver characterized by a set of one or more performance parameters which control a reliable two-way communications range between the interrogator transceiver and any of the RFID tag transceivers;

an antenna which is connected to the interrogator transceiver and which is adapted for mounting on a person near one hand of the person, so that the person can reduce the distance between the antenna and a tag transceiver to a minimum distance by extending his hand toward the tag transceiver; and a control logic circuit, connected to the interrogator transceiver, for adjusting at least one of said performance parameters so that the reliable two-way communications range between the interrogator transceiver and the transceiver of each of the tagged objects slightly exceeds said minimum distance.

4. An RFID system having an adjustable two-way communication range so as to permit a person to individually interrogate the closest one of a plurality of nearby tagged objects, comprising:

a plurality of tagged objects, wherein each tagged object includes a respective RFID tag transceiver attached thereto;

an RFID interrogator transceiver characterized by a set of one or more performance parameters which control a reliable two-way communications range between the interrogator transceiver and any of the RFID tag transceivers;

an antenna which is connected to the interrogator transceiver and which is adapted for mounting on a person near one hand of the person, so that the person can reduce the distance between the antenna and a tag transceiver to a minimum distance by extending his hand toward the tag transceiver; and a control logic circuit, connected to the interrogator transceiver, for adjusting at least one of said performance parameters so that the reliable two-way communications range between the interrogator transceiver and the transceiver of each of the tagged objects slightly exceeds said minimum distance.

5. An RFID interrogator apparatus according to claim 4, wherein:

the RFID tag transceiver of each tagged object is mounted near a handle on its respective tagged object; and said minimum distance is a distance between the antenna and the tag transceiver of one of the tagged objects when said person grasps the handle of said one tagged object.

* * * * *